United States Patent
Hammerschmidt (10) Patent No.: US 9,523,989 B2
(45) Date of Patent: *Dec. 20, 2016

(54) SYSTEM AND METHOD FOR A POWER SUPPLY

(71) Applicant: Infineon Technologies AG, Neubiberg (DE)

(72) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,412

(22) Filed: Nov. 23, 2015

(65) Prior Publication Data

US 2016/0091905 A1 Mar. 31, 2016

Related U.S. Application Data

(63) Continuation of application No. 13/785,997, filed on Mar. 5, 2013, now Pat. No. 9,201,435.

(51) Int. Cl.
| | |
|---|---|
| *H03M 1/66* | (2006.01) |
| *G05F 1/10* | (2006.01) |
| *H02M 3/156* | (2006.01) |
| *G05F 1/59* | (2006.01) |

(52) U.S. Cl.
CPC . *G05F 1/10* (2013.01); *G05F 1/59* (2013.01); *H02M 3/156* (2013.01)

(58) Field of Classification Search
CPC .......... H03M 1/10; H03M 1/183; H03M 1/66; H03M 1/46; H03M 1/0845; H02M 3/156; H02M 3/1584; H02M 3/157; H02M 3/158; H02M 3/1588; H02M 2001/0025; H02M 2001/0045; H02M 3/33507; H02M 1/08
USPC ................................ 323/282, 350, 272, 288
See application file for complete search history.

(56) References Cited

U.S. PATENT DOCUMENTS

| | | | |
|---|---|---|---|
| 4,458,209 A | 7/1984 | Miller et al. | |
| 5,369,564 A | 11/1994 | Choi | |
| 5,744,968 A * | 4/1998 | Czarnocki | ............. G01P 15/131 324/608 |
| 6,130,526 A | 10/2000 | Yang et al. | |
| 6,349,427 B1 | 2/2002 | Bergstrom | |
| 6,624,918 B1 | 9/2003 | French et al. | |
| 6,687,644 B1 | 2/2004 | Zinke et al. | |

(Continued)

FOREIGN PATENT DOCUMENTS

| | | |
|---|---|---|
| CN | 101415579 A | 4/2009 |
| CN | 101881984 A | 11/2010 |
| CN | 102273069 A | 12/2011 |
| DE | 60311098 T2 | 11/2007 |

*Primary Examiner* — Linh Nguyen
(74) *Attorney, Agent, or Firm* — Slater Matsil LLP (57) ABSTRACT

In accordance with an embodiment, a method of controlling a power supply node includes measuring a voltage of the power supply node, determining a first current based on the measuring, determining a first current and a second current based on the measuring, and summing the first current and the second current at the power supply node. Determining the first current includes operating a first controller having a first bandwidth, and determining the second current includes operating a second controller having a second bandwidth greater than the first bandwidth.

26 Claims, 6 Drawing Sheets

(56) References Cited

U.S. PATENT DOCUMENTS

| | | | |
|---|---|---|---|
| 6,750,637 B2* | 6/2004 | Nagaki | H02M 3/1584 |
| | | | 323/272 |
| 7,259,473 B2* | 8/2007 | Petricek | H02J 1/10 |
| | | | 307/44 |
| 7,499,682 B2* | 3/2009 | Rozenblit | H03F 1/0205 |
| | | | 323/351 |
| 9,201,435 B2* | 12/2015 | Hammerschmidt | G05F 1/10 |
| 2002/0125872 A1* | 9/2002 | Groom | H02M 3/156 |
| | | | 323/288 |
| 2005/0174099 A1 | 8/2005 | Ohkubo et al. | |
| 2006/0181258 A1* | 8/2006 | Benbrik | G05F 1/565 |
| | | | 323/315 |
| 2008/0094098 A1* | 4/2008 | Sullivan | G11C 29/56 |
| | | | 324/764.01 |
| 2008/0157742 A1 | 7/2008 | Martin et al. | |
| 2008/0265862 A1* | 10/2008 | Burdenski | H02M 3/1584 |
| | | | 323/350 |
| 2009/0067202 A1 | 3/2009 | Ichikawa et al. | |
| 2009/0302812 A1* | 12/2009 | Shor | G05F 1/563 |
| | | | 323/223 |
| 2010/0264893 A1 | 10/2010 | Li | |
| 2012/0053753 A1* | 3/2012 | Wilson | H03F 1/0227 |
| | | | 700/298 |
| 2012/0176118 A1 | 7/2012 | Pyeon et al. | |
| 2012/0264973 A1 | 10/2012 | Baumann et al. | |
| 2013/0033357 A1 | 2/2013 | Hammerschmidt | |
| 2013/0043908 A1 | 2/2013 | Hammerschmidt | |
| 2013/0141072 A1* | 6/2013 | Khlat | G05F 3/02 |
| | | | 323/304 |

* cited by examiner

FIG. 1a

PRIOR ART

SYSTEM AND METHOD FOR A POWER SUPPLY

This is a continuation application of U.S. Non-Provisional application Ser. No. 13/785,997, titled "System and Method for a Power Supply," filed on Mar. 5, 2013, which application is hereby incorporated herein by reference in its entirety.

TECHNICAL FIELD

This invention relates generally to semiconductor circuits and methods, and more particularly to a system and method for a power supply.

BACKGROUND

Automotive electronic systems, such as airbag systems, antilock brake systems (ABS) and passenger restraint systems often include electronic components that are physically distributed throughout the automobile. For example, an airbag system may contain an electronic control unit (ECU) coupled to one or more sensors, a driver circuit and an airbag. The driver is controlled by the ECU and may include a squib and a triggering element. When a sensor senses a sudden change in acceleration, it signals the ECU, which, in turn, signals the driver circuit to ignite the squib, thereby deploying the airbag.

The sensors are often located outside the ECU, often at relatively long distances, and may be connected to the ECU via several meters of wire. These wires are a significant cost factor in automotive systems and further contribute to the weight of the car. In order to minimize the weight and cost of the system, the number of wires used to connect a sensor to its corresponding ECU is often limited to the minimum of 2 lines. These lines are used to supply power to the sensor and to transmit the data back to the ECU by modulating the current consumption of the sensor. Example interfaces that support operation in the manner are the Peripheral Sensor Interface PSI5, and the Digital Sensor Interface (DSI), which are both intended for the use in automotive airbag or powertrain systems. Other examples include the pulsewidth modulation (PWM) based protocols used by the Infineon TLE4941 and TLE4942 ABS wheel speed sensors, and by the ABS sensor protocol described in European Patent Application No. EP 0 944 888 B1.

One issue of using long wires to connect sensors to the ECU is line resonance due to line inductance and capacitance. In some systems a RC filter may be placed between the interface of the sensor interface and the long wires used to connect the ECU with the sensor satellites in order to provide damping of the resonance between the line inductance and capacitors on the sensor side as well as on the ECU side and to attenuate injected EMC. In other systems, ringing due to resonance is attenuated by actively controlling the line voltage using a control loop.

SUMMARY OF THE INVENTION

In accordance with an embodiment, a method of controlling a power supply node includes measuring a voltage of the power supply node, determining a first current based on the measuring, determining a first current and a second current based on the measuring, and summing the first current and the second current at the power supply node. Determining the first current includes operating a first controller having a first bandwidth, and determining the second current includes operating a second controller having a second bandwidth greater than the first bandwidth.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a power supply circuit used for remote sensors in automotive systems. In particular, embodiments of the present invention may be applied to voltage controllers that use digital control loops and controlled current sources as output stages. In some embodiments, the control bandwidth of the system may be increased without an excessive loss of efficiency as defined as $$\frac{P_O}{P_O + P_{INT}},$$

wherein $P_O$ is the power delivered at the output of the supply and $P_{INT}$ is the internally consumed power. The invention may also be applied, however, to other types of circuits, systems, and methods directed toward power supplies, signal generators, or control systems.

Figure 1A:
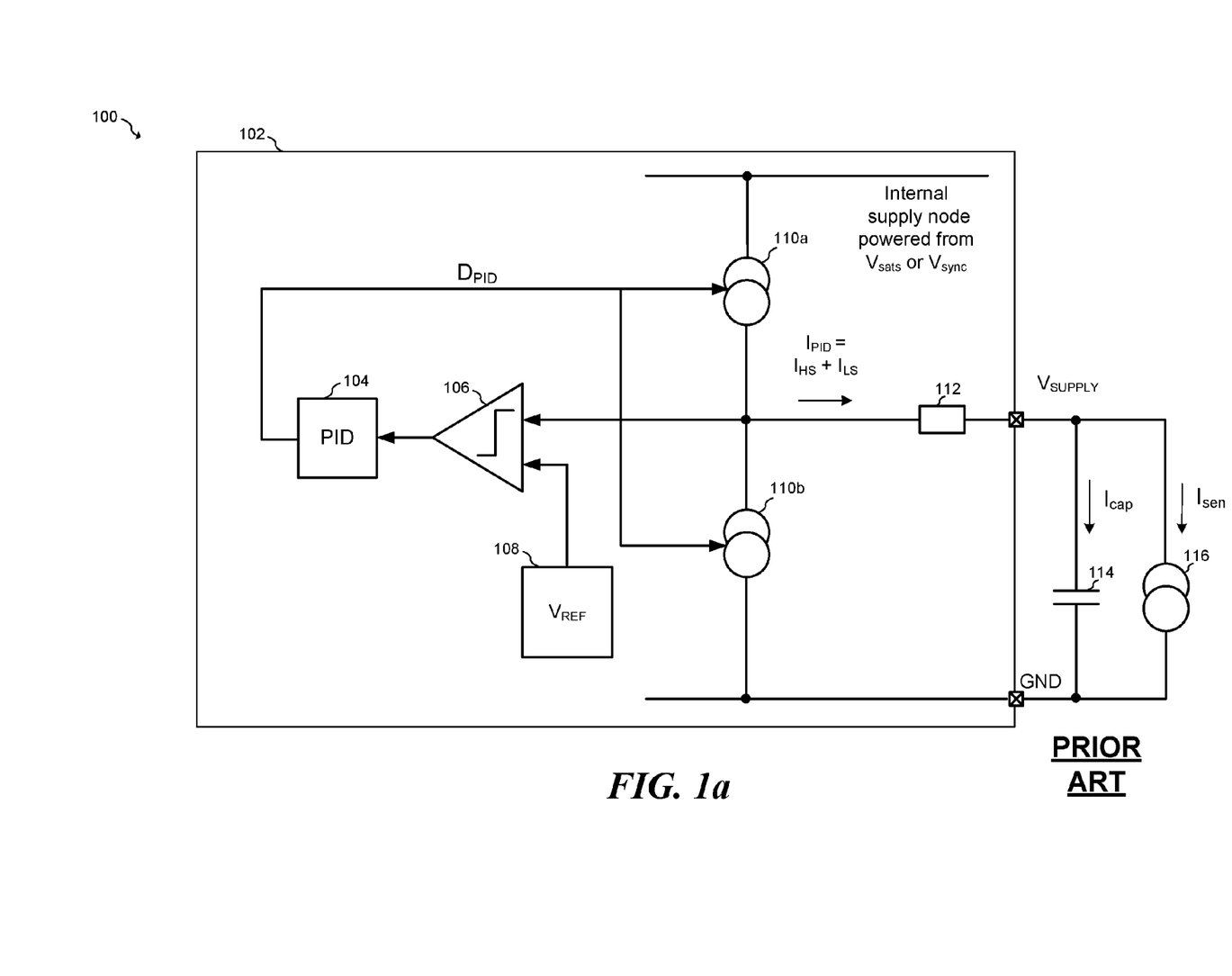
FIGS. 1a-b illustrate a block diagram and schematics of a conventional voltage controller.

FIG. 1a illustrates conventional sensor supply system 100 system that includes voltage controller 102 coupled to a sensor represented as current source 116 via supply node $V_{SUPPLY}$. The capacitive loading at $V_{SUPPLY}$ is further represented by capacitor 114. Voltage controller 102 provides current to supply node $V_{SUPPLY}$ via positive current source 110a and negative current source 110b that are controlled by proportional-integral-differential (PID) controller 104. Feedback from node $V_{SUPPLY}$ comes from comparator or analog-to-digital converter (ADC) 106 that compares the voltage of supply node $V_{SUPPLY}$ with a reference voltage $V_{ref}$ generated by reference voltage generator 108. Resistor 112 is included in the system to perform line damping to limit the Q factor of the line resonances.

During operation of voltage controller 102, if the input of comparator 106 is higher or lower than $V_{REF}$, comparator 106 signals PID controller 104 that sets the control signal $D_{PID}$ for output current sources 110a and 110b accordingly. For example, if the input voltage of comparator 106 is higher than $V_{REF}$, the action of the control loop will cause current source 110b, on average, to source current in order to decrease output voltage $V_{SUPPLY}$. On the other hand, if the input voltage of comparator 106 is lower than $V_{REF}$, the action of the control loop will cause current source 110a, on average, to source current in order to increase output voltage $V_{SUPPLY}$. The net result of this adjustment is that $V_{SUPPLY}$ is controlled to a voltage of about voltage $V_{REF}$. The dynamics of this operation may be adjusted according to the control parameters of PID controller 104.

For fast control loops, however, the bandwidth of current sources 110a and 110b limit the performance of the voltage controller due to the large currents that need to be delivered and the resulting physical size of the current sources. For example, in a PSI or DSI sensor bus application, the dynamic range of the output current may be in the range of between about −100 mA to about +150 mA, and the output voltage can range from about 0 V to about 18 V. Semiconductor devices configured to handle currents of this magnitude are generally physically large and include a significant amount of parasitic capacitance.

Figure 1B:
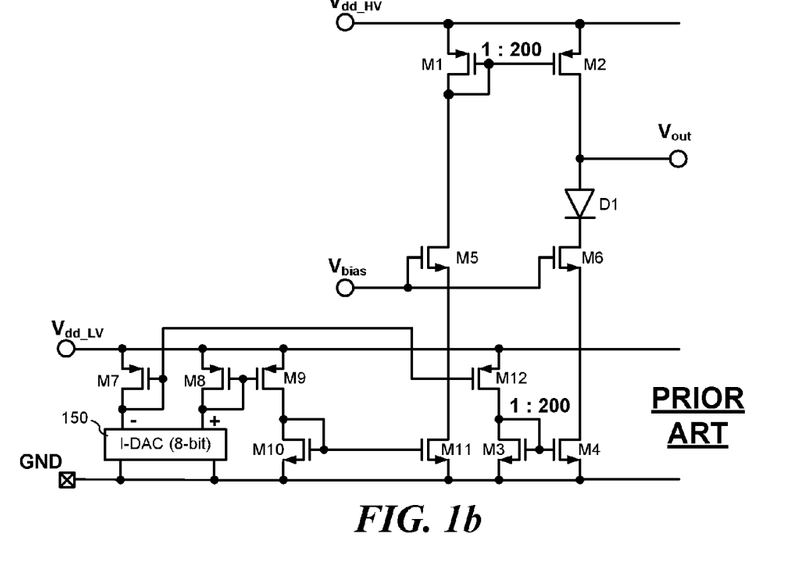

FIG. 1b illustrates a conventional current source arrangement that may be used to implement current sources 110a and 110b. Here the output current of current digital-to-analog converter (IDAC) 150 is mirrored to output node Vout via a number of current mirrors. For example, the negative output of IDAC 150 is mirrored via a first mirror including PMOS devices M7 and M12, and then to the output node via a negative output current mirror including NMOS devices M3 and M4. Similarly, the positive output of IDAC 105 is mirrored via second current mirror including PMOS devices M8 and M9, a third current mirror including NMOS devices M10 and M11, and a positive output mirror including PMOS device M1 and M2. Optional cascode devices M5 and M5 prevent device breakdown in high voltage conditions in cases where supply voltage Vdd_HV poses a problem for device breakdown, or where the mirroring accuracy of NMOS devices M11 and M4 are comprised due to higher drain-source voltages. Diode D1 provides reverse voltage protection. The current mirror structures and cascode devices depicted in FIG. 1b may be realized in other ways. For example, amplifiers may be incorporated to control the biasing of cascode devices M5 and M6 to improve the performance of the current mirror on the NMOS and/or PMOS side. In the illustrated case, IDAC 150 is implemented as a current steering IDAC in which the MSB or sign bit of the DAC control word determines whether the programmed current is output via transistor M4 or via transistor M2.

As can be seen by FIG. 1b, the positive and negative output current mirrors have a device ratio of 1:200, which means that the width/length ratio of output devices M2 and M4 are 200 times the width/length ratio of mirror devices M1 and M3, respectively. Having a high mirror ratio reduces the overall power consumption of the circuit by reducing power consumed by intermediate current mirrors. On the other hand, the presence of a high mirror ratio creates a high impedance at the output of transistors M5 and M12 at the input of the output current mirrors, and a high capacitance at the gates of transistors M2 and M4 at the output of the output current mirrors. As such, this effectively limits the output bandwidth of the current mirror. In some applications, this limited bandwidth may occur at about 2 MHz, which may be sufficient for lower bandwidth voltage regulators, but may limit the ability to which the line may be controlled at higher frequencies.

In the case of PSI and DSI interfaces, the load seen by voltage controller includes a two wire line with a blocking capacitor represented by capacitor 114 on the ECU side, and up to 4 sensors distributed along the line. When sensors are located close together, they may be electrically models as a lumped network of capacitors and resistors. This load, along with the line inductance, forms at least a parallel resonance and a serial resonance, which both cause specific control issues. The series resonance creates a low impedance of the plant at its resonance frequency that may lead to needing a high control loop gain around the series resonance frequency. The parallel resonance frequency is normally higher than the series resonance and produces a strong increase of the impedance around the parallel resonance frequency. This parallel resonance may have a high Q-Factor if in the case of small sensor input resistors.

The issue of a high Q-factor at the parallel resonance frequency may be addressed, for example, by reducing the control loop gain at this frequency, for example below 1. However, the reduction of this control loop gain could make it more difficult for the system to track signals on the sensor bus. Alternatively, the control bandwidth of the system could be adjusted to be higher than the parallel resonance frequency. One way to increase the control bandwidth is to reduce the mirror ratio of the output current source, for example from 1:200 to 1:10. Such a reduction, however, may reduce the efficiency of the controller because of the increase reference current dissipated within the system.

Embodiments of the present invention provide a high control bandwidth while maintaining efficient power consumption by splitting the control path into at least one low frequency slow path and a higher frequency fast path. For example, the slow path may deliver the major supply current for the particular circuit being supplied, such as a sensor, and the fast path may be used to control higher frequency currents that are lower in magnitude than the magnitude of the supply current controlled by the slow path. For example, these higher frequency currents may be due to resonant ringing at the parallel resonant frequency. In some embodiments, the controller used by the slow path may run at a slower clock frequency than the controller used by the fast path and use an output stage having a bandwidth lower than the series or parallel resonance frequency of the system. Consequently, in some embodiments, the slow path may be implemented using high mirror ratios that reduce the amount of power consumed in preceding stages. On the other hand, one or more fast paths may be implemented having higher bandwidths and less efficient current sources in order to respond to faster line transients. In some embodiments, because the overall amount of current that needs to be sourced by these higher bandwidth current sources is lower, the power internally consumed by the fast paths does not significantly degrade the overall efficiency of the complete controller.

Figure 2A:
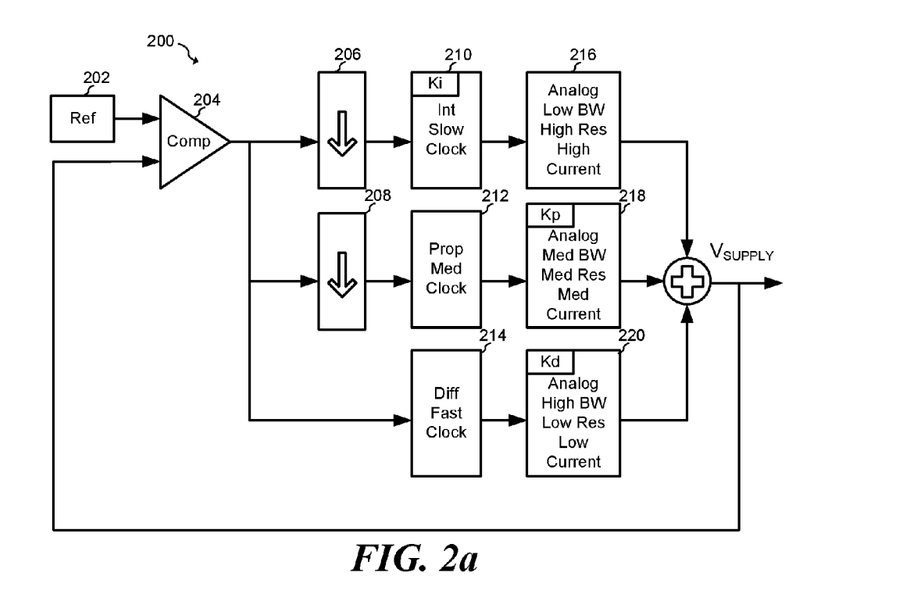
FIGS. 2a-b illustrate a block diagram of an embodiment voltage controller and a corresponding frequency response graph.

FIG. 2a illustrates voltage controller 200 according to an embodiment of the present invention. In this embodiment, voltage controller 200 is split up into three parallel control paths. The input stage to voltage controller 200 includes comparator 204 that compares the voltage at output node is the supply to a reference voltage that is generated by reference voltage generator 202. In some embodiments, the analog feedback signal is digitized using a single fast comparator, such as comparator 204. Alternatively, an analog-to-digital converter may be used, for example a two bit or four bit flash ADC or an ADC having a higher bit resolution. In other embodiments the ADC may also be split into a fast ADC, e.g. comparator or low resolution flash ADC, for the fast path and a slow ADC with higher resolution, e.g. successive approximation ADC or sigma delta ADC, for the slower paths.

The first parallel control path is an integral controller that is made up of digital integrator 210 and analog output stage 216 that includes an IDAC and a current mirror having, for example, a large mirror ratio. Decimator 206 may be used to reduce the clock rate utilized by digital integrator 210 via a first downsampling ratio in order to achieve a further reduction of power consumption in the digital part. In embodiments, digital integrator 210 may be implemented using, for example, a digital accumulator. Gain factor Ki may be applied by shifting the output of the accumulator, or by applying a gain factor in the analog domain in block 216 by adjusting an internal reference current.

The second control path is a proportional controller that is made up of proportional digital block 212 and analog output stage 218 that includes an IDAC and a current mirror having, for example, a mirror ratio that is smaller than a mirror ratio of an output current source included within analog output stage 216. Decimator or 208 may be used to reduce the clock rate utilized by proportional digital block 212 via a second downsampling ratio, and digital proportional block 212 may be implemented using a buffer and/or register. In one embodiment, the second downsampling ratio is less than the downsampling ratio of decimator 206. Proportional factor Kp may be set in the analog domain within block 218 by adjusting an internal reference current. Alternatively, factor Kp may be adjusted in the digital domain.

Lastly, the third control path is a differential controller that is made up of digital differentiator 214 and analog output stage 220 that has an IDAC and a current mirror having, for example, a mirror ratio that is smaller than the mirror ratios of analog output stages 216 and 218. In one embodiment, digital differentiator 214 may be implemented using a register and a digital subtraction circuit. Differential gain factor Kd may be set in the analog domain within block 220 by adjusting an internal reference current. Alternatively, Kd may be adjusted in the digital domain using a multiplier and/or by shifting its output.

In the embodiment of FIG. 2a, integral controller 210, proportional controller 212 and differentiator 214 are used to implement controller 200. It should be understood that in alternative embodiments, other controller types may be used in place of integral controller 210, proportional controller 212 and differentiator 214. For example, in some embodiments, the various control paths may be designed and implemented using state-space design and other known control system techniques using various feedback structures. In such embodiments, the controller may be broken down in to different paths having various bandwidths, such that higher bandwidth paths are clocked at a higher frequency than lower bandwidth paths and/or are implemented using various resolutions. In further embodiments, various non-linear control elements may also be used.

In embodiments, the sampling rates of each control path is set to be about 5 to 20 times higher than a highest required sampling frequency for each control path. For example, in one embodiment, the sampling rate of comparator 204 and fast path blocks 214 and 220 is about 80 MHz; the sampling rate of proportional path blocks 212 and 218 is about 20 MHz, and the sampling rate of slow path blocks 210 and 216 is about 5 MHz. In such an embodiment, the decimation ratios of decimators 206 and 208 are to set to about 16 and 4, respectively. It should be appreciated that these sampling rates are just one example of many possible sampling rate combinations and alternative embodiments may employ different sampling rates and decimation factors.

The analog output stage of each path may be optimized in a similar manner as the sampling frequencies of the digital control hardware. For example, each current mirror may be designed to have a bandwidth in accordance with the particular control frequency needed in each stage. For example, output block 216 may have a control bandwidth of up to 500 KHz, output block 218 may have a control bandwidth between about 500 KHz up to about 2 MHz, and output block 220 may have a control bandwidth greater than 2 MHz. Furthermore, the bit resolution of the IDACs within each analog output block may be adjusted. For example, analog output block 216 may have an 8-16 bit IDAC, analog output block 218 may have a 4-10 bit IDAC and analog output block 220 may have a 1-4 bit IDAC. Furthermore, the maximum current that can be sourced by each output stage may also be allocated. In one embodiment, output stage 216 may have a maximum output current of about 100 mA, output stage 218 may have a maximum output current of between about 50 mA and about 20 mA and output stage 220 may have a maximum output current of about 10 mA or even lower. Furthermore, the DACs may be realized using different circuit topologies. For example, a sigma delta DAC including analog filters may be used for the slowest DACs and a current steering DAC may be used for the fastest DAC. Again, it should be appreciated that these control bandwidth, data converter resolutions and output current allocations are just one example of many possible combinations and alternative embodiments may employ different control bandwidths, data converter resolutions and output current allocations rates and decimation factors.

It should be appreciated that, in alternative embodiments of the present invention, other controller topologies besides PID, PD, and PI may be used. For example, various control topologies of varying bandwidths may be used to implement the control paths of various speeds shown in FIG. 2a.

Figure 2B:
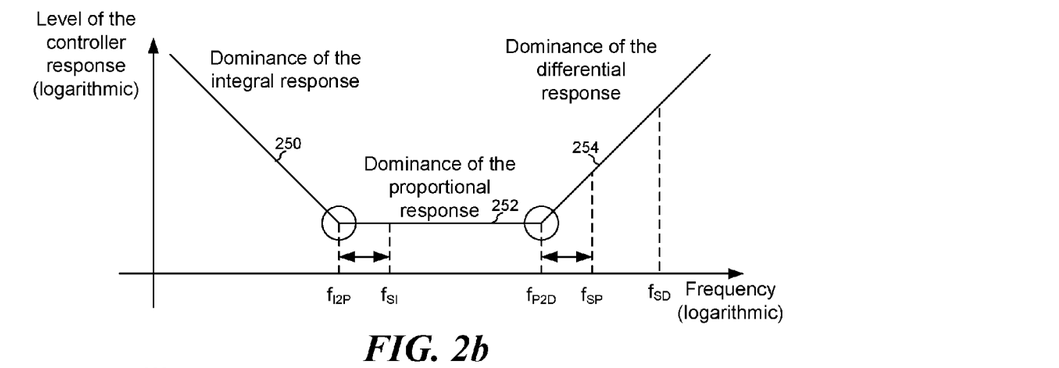

FIG. 2b illustrates a frequency response plot of the combined controller shown in FIG. 2a. Curve 250 represents a region of operation in which the integral response is dominant, curve 252 represents a region of operation in which the proportional response is dominant, and curve 254 illustrates the region of operation in which the differential response is dominant. In an embodiment, the integral response is dominant up to a corner frequency of about $f_{I2P}$, the proportional response is dominant up to a corner frequency of about $f_{P2D}$, above which the differential response is dominant. Frequencies $f_{SI}$, $f_{SP}$, and $f_{SD}$ represent the sampling frequencies of the integral, proportional and differential paths, respectively. In one embodiment, $f_{I2P}$ is about 500 KHz, $f_{SI}$ is about 5 MHz, $f_{P2D}$ is between about 5 MHz and about 10 MHz, $f_{SP}$ is about 20 MHz and $f_{SD}$ is about 80 MHz. Alternatively, other values may be used for these frequencies.

Figure 3A:
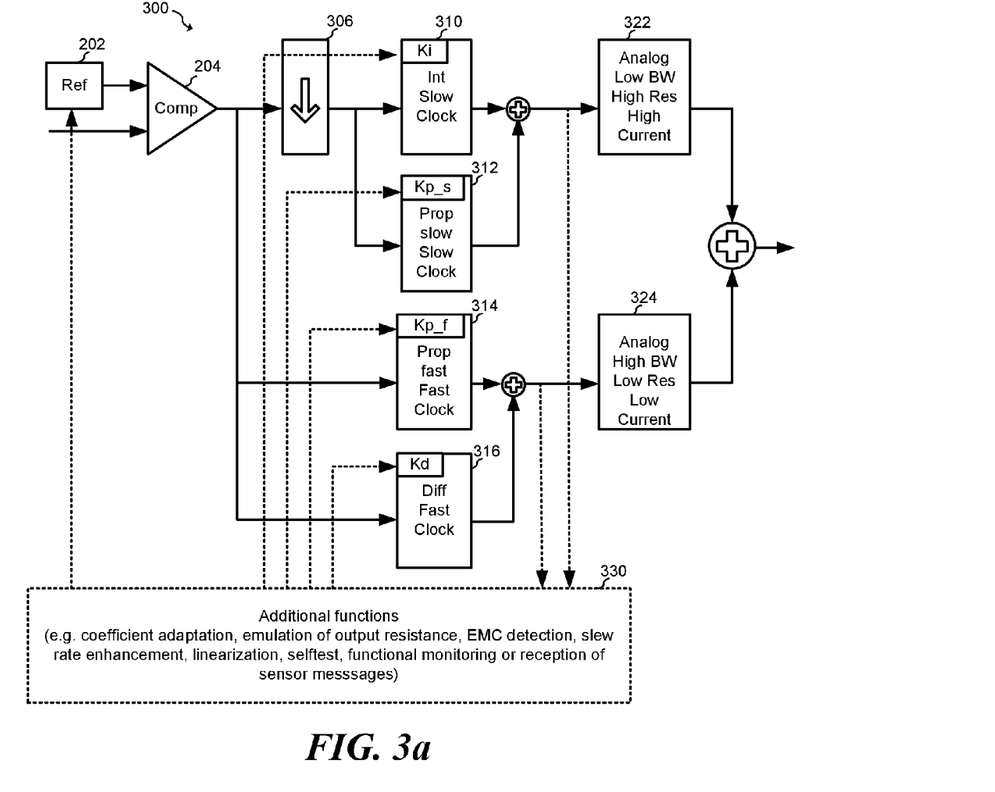
FIGS. 3a-b illustrate a block diagram of a further embodiment voltage controller and a corresponding frequency response graph.

FIG. 3a illustrates embodiment voltage controller 300 in which the control paths are divided into two paths. The first control path is a PI path having a digital integrator block 310 in parallel with Digital proportional block 312. The outputs of blocks 310 and 312 are summed together and coupled to analog output block 322 that contains an IDAC and an output current mirror. The second control path is a PD path having digital proportional block 314 coupled in parallel with digital differential block 316, the outputs of which are summed together and coupled to the input of analog output block 324. Analog output block 324 contains an IDAC and a current mirror. In an embodiment, the second control path is operated at a higher frequency than the first control path, as decimator 306 decimates the input to digital blocks 310 and 312. Analog output block 322 of the first control path may have a high resolution IDAC and a low bandwidth current mirror having, for example, a high mirror ratio. On the other hand, analog output block 324 of the second control path may have a lower resolution IDAC and a higher bandwidth current mirror having, for example, a mirror ratio that is lower than the mirror ratio in analog block 322. In addition, analog block 322 may be configured to output a higher maximum current than analog output block 324.

In an embodiment, the gain factors Ki of digital integrator for 310, Kp_s of digital proportional block 312, Kp_f of digital proportional block 314 and Kd of digital differentiator block 316 may be programmable according to additional functions represented by block 330. Such additional functions may include, for example, coefficient adaptation, emulation of output resistance, EMC detection, slew rate enhancement, linearization, self-test functions, functional monitoring and/or reception of sensor messages. These and other functions are described in U.S. patent application Ser. No. 13/197,288 entitled "Sensor interface with Variable Control Coefficients" filed on Aug. 3, 2011; U.S. patent application Ser. No. 13/212,463 entitled "Sensor Interface Making Use of Virtual Resistor Techniques" filed on Aug. 18, 2011; and U.S. patent application Ser. No. 13/430,105 entitled "Sensor Interface Transceiver" filed on Mar. 26, 2012; which applications are incorporated by reference herein in their entireties. Furthermore, in some embodiments, some or all of gain factors Ki, Kp_s, Kp_f and Kd may be implemented in the digital domain in blocks 310, 312, 314 and 316, respectively and/or in the analog domain by scaling currents in analog blocks 322 and 324. In some embodiments, the implementation of a single gain factor may be split between the analog and digital domains. Furthermore, in some implementations, using two control paths instead of three control paths may result in some power savings.

In one embodiment, the IDAC within analog output block 322 is implemented using an 8-bit current DAC that operates at a sampling rate of 50 MHz, and the IDAC within analog output block 324 is implemented using a 4-bit IDAC that operates at a sampling rate of 250 MHz. In alternative embodiments, these IDACs may have different bit resolutions or switching frequencies.

Figure 3B:
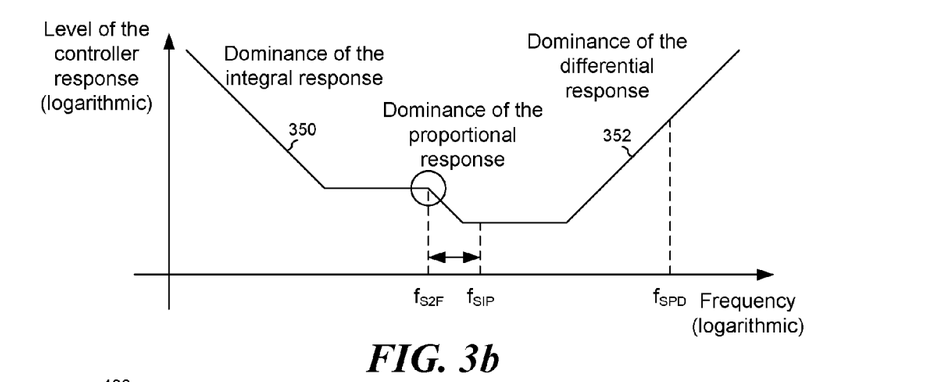

FIG. 3b illustrates a frequency response plot of the combined controller shown in FIG. 3a. Curve 350 represents the region of operation in which the PI integral response is dominant, and curve 352 represents the region of operation in which the PD response is dominant. In an embodiment, the PI response is dominant up to a corner frequency of about $f_{S2F}$, above which, the PD response is dominant. Frequencies $f_{SIP}$ and $f_{SPD}$ represent the sampling frequencies of the first (PI) path and the second (PD) path, respectively. In one embodiment, $f_{S2F}$ is about 2 MHz, $f_{SIP}$, is about 50 MHz, and $f_{SPD}$ is about 250 MHz. Alternatively, other values may be used for these frequencies. The sampling frequency of the slow path may be chosen with a sufficient margin over the bandwidth of the slow output stage in order to avoid a visible decrease of the slow path performance due to delay in the digital calculation hardware. On the other hand, sampling frequency of the fast path may be linked to a closed loop bandwidth requirement that is determined, for example, by the frequency range in which high frequency transients (i.e., due to resonance) are to be suppressed.

Figure 4:
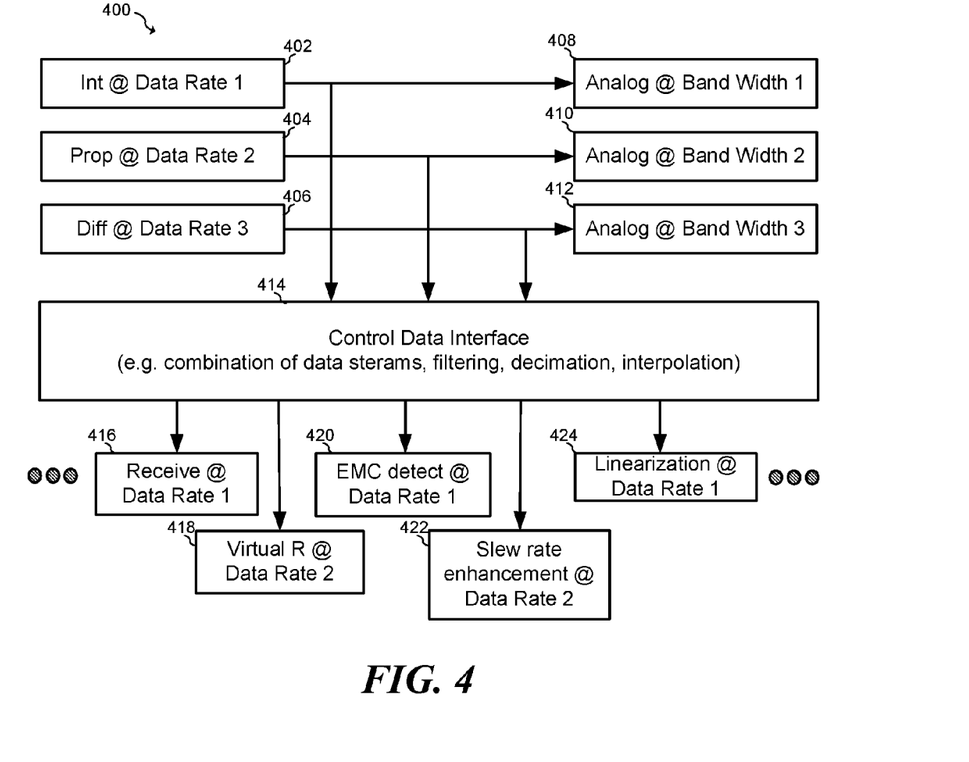
FIG. 4 illustrates an embodiment voltage controller interfaced with an embodiment control data interface.

FIG. 4 illustrates a block diagram of controller 400 that shows how the outputs of digital control blocks 402, 404 and 406 may be interfaced to control data interface 414 to perform various other controller functions. As illustrated, controller 400 includes digital integrator, 402 coupled to analog output stage 408, digital proportional block 404 coupled to analog output stage 410 and digital differentiator 406 coupled to analog output stage 412. In addition, the output of digital blocks 402, 404 and 406 provide data at different data rates 1, 2 and 3, respectively. In one embodiment, data rate 1 is less than data rate 2, and data rate 3 is the highest data rate. These data rates may correspond to the data rates of the embodiment shown in FIG. 2a hereinabove, or may correspond to other data rates.

Control data interface 414 performs a variety of functions on the outputs of digital control blocks 402, 404 and 406, for example, combining, filtering, decimating and interpolating data streams in order to provide date to a receive data function at data rate 1 performed in block 416, a virtual resistance function at data rate 2 performed by block 418, an EMC detection function at data rate 1 performed in block 420, a slew rate enhancement at data rate 2 performed in block 422, and linearization performed at data rate 1 performed in block 424. These functions may be implemented as described in U.S. patent application Ser. Nos. 13/197,288, 13/212,463 and 13/430,105 as referenced above.

In embodiment, the receive function of block 416 detects the current levels and extracts the data that was sent by the sensor according to the particular protocol used (e.g. PSI or DSI). Block 416 uses a combination of outputs from integral block 402 and proportional block 404, in which the output of proportional block 404 is decimated by a factor of two and summed with the output of integral block 402.

The virtual resistance function of block 418 emulates the behavior of resistor 112 without having a real resistor in this place. This may be done, for example, by controlling the output in a way that its voltage drops for the case that the sensor current is increasing. In some embodiments, this behavior can be limited to frequencies in the range of the modulation and resonance frequencies. In such cases, the DC supply current may be excluded from generation voltage drop, thereby saving power. Virtual resistor block 418 uses, for example the outputs of all digital control blocks 402, 404 and 406 and decimates the output of differential block 406 by a factor of two, which is summed with the output of integral block 402 and proportional block 404. In this case, the output of integral block 402 may be held over two clock cycles or linearly interpolated. EMC detection block 420 also uses the outputs of all digital control blocks 402, 404 and 406, decimates the output of differential block 406 by a factor of four and decimates the output of proportional block 404 by a factor of two, and sums the decimated signals with the output of integral block 402 at the first data rate.

Slew rate enhancement block 422 function determined whether transients are to be generated by following a target pattern for the reference voltage and temporarily increasing the PID control coefficients. In some embodiment, this change in PID control coefficients is effected in a manner that performs a tradeoff between speed and stability in front of the background that every edge of a voltage modulation is followed by a constant period in the protocol. During these constant periods, the coefficients may be switched back to a more stable setup such that upcoming oscillations may be rapidly suppressed.

Slew rate enhancement block 422 uses the outputs of proportional block 404 summed with the output of differential block 406 that is decimated by a factor of two. Lastly, linearization block 424 uses the output of proportional block 404 decimated by a factor of two, which is summed with the output of integral block 402. In alternative embodiments, different signal combinations and different decimation factors may be used depending on the relative bandwidths and dynamic control data needed by each function. In further embodiments, other functions may be supplied with inputs taken from integral block 402, proportional block 404 and differential block 406. In a further embodiment, different combinations of signals may also be similarly combined using other control path arrangements, for example, the two path arrangement shown in FIG. 2a and discussed hereinabove.

Figure 5:
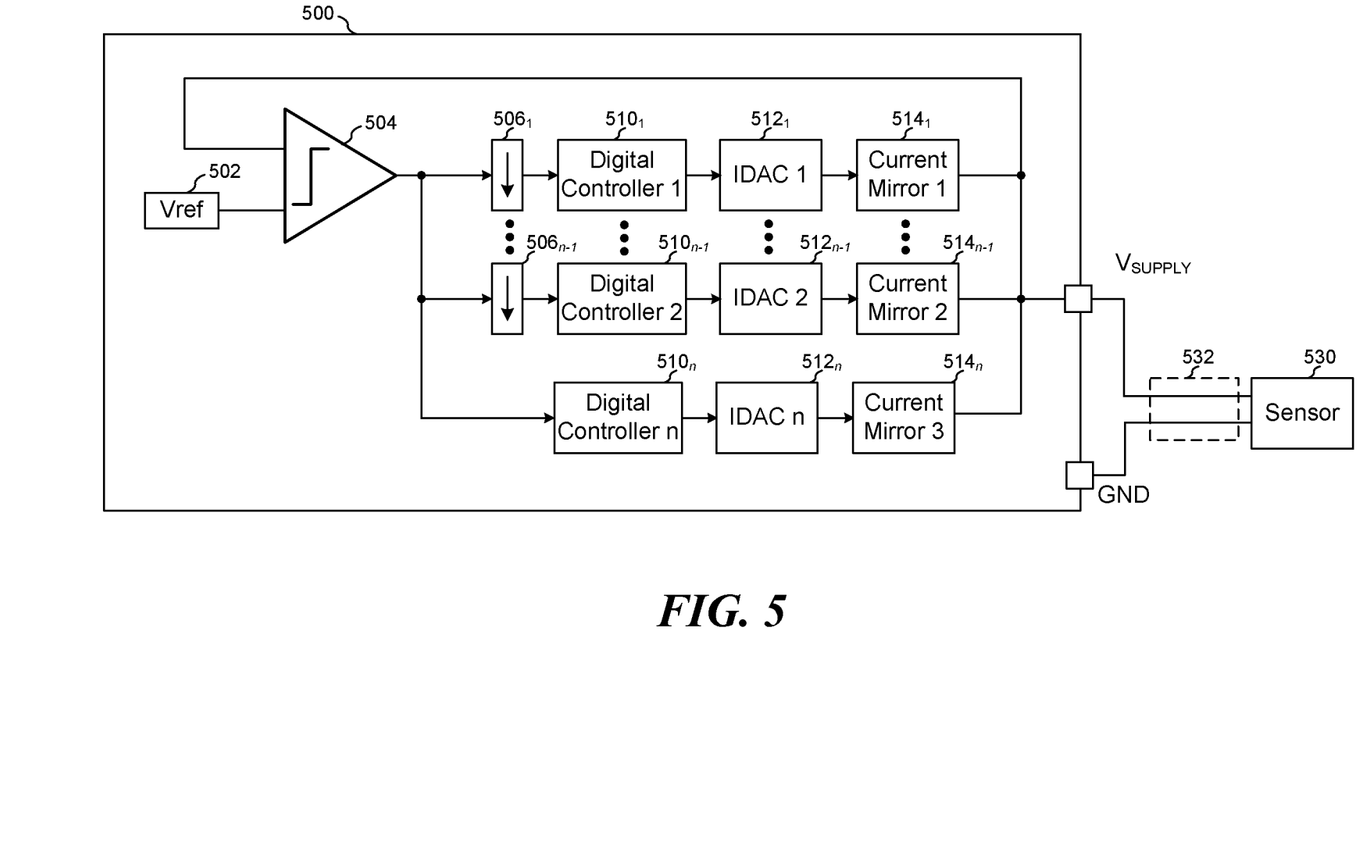
FIG. 5 illustrates an embodiment voltage controller integrated circuit.

FIG. 5 illustrates embodiment voltage controller integrated circuit 500 having n control paths to control supply node $V_{SUPPLY}$. Comparator 504 compares the voltage at $V_{SUPPLY}$ to a voltage generated by reference generator 502. In an embodiment, the output of comparator is a digital bitstream that is routed to n parallel control paths, where n can be between 2 and greater. In an embodiment, each control path has a digital controller $510_1$ to $510_n$, an IDAC $512_1$ to $512_n$ and a current mirror $514_1$ to $514_n$, the outputs of which are summed together at node $V_{SUPPLY}$. The first n−1 control paths have decimators $506_1$ to $506_{n-1}$ that reduce the sample rate. In one embodiment, the decimation rate of decimator $506_k$ is less than the decimation rate of decimator $506_{k-1}$ for k between 2 and n−1. Furthermore, the bandwidth of current mirror $514_k$ is greater than the bandwidth of current mirror $514_{k-1}$, and the maximum output current of current mirror $514_k$ is greater than the maximum output current of current mirror $514_{k-1}$, for k between 2 and n for some embodiments in accordance with other embodiments described above. The control algorithms in digital controllers $510_1$ to $510_n$ may be such that the control bandwidth increases with increasing n. As shown, supply node $V_{SUPPLY}$ is coupled to sensor 530 via line 532.

Figure 6:
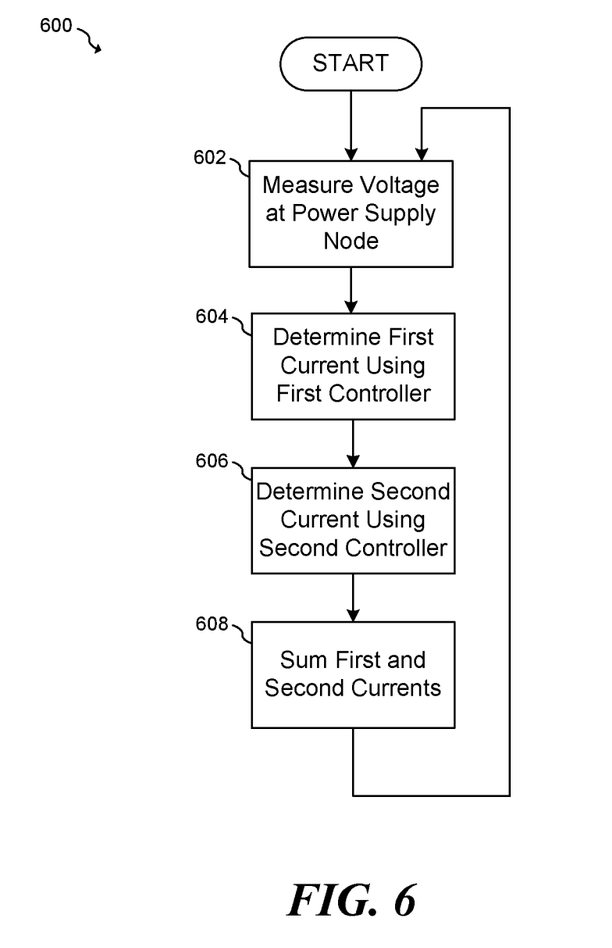
FIG. 6 illustrates a block diagram of the embodiment method.

FIG. 6 illustrates a block diagram of embodiment method 600. In an embodiment, a voltage of the power supply node is measured in step 602. In step 604, a first current is determined based on the measuring, where the determining the first current includes operating a first controller having a first bandwidth. In step 606, a second current is determined based on the measuring, where the determining the first current includes operating a second controller having a second bandwidth greater than the first bandwidth. In step 608, the first and second currents are summed at the power supply node.

In accordance with an embodiment, a method of controlling a power supply node includes measuring a voltage of the power supply node, determining a first current based on the measuring, determining a first current and a second current based on the measuring, and summing the first current and the second current at the power supply node. Determining the first current includes operating a first controller having a first bandwidth, and determining the second current includes operating a second controller having a second bandwidth greater than the first bandwidth. In some embodiments, power may be supplied to an electronic device having a power supply coupled to the power supply node.

The first controller may include a proportional-integral (PI) controller, and the second controller may include a proportional-differential (PD) controller. Furthermore, operating the first controller may include operating the first controller at a first sampling rate, the operating the second controller may include operating the second controller at a second sampling rate greater than the first sampling rate. In an embodiment, summing the first current and the second current includes mirroring the first current to the power supply node using a first current mirror, and mirroring the second current to the power supply node using a second current mirror.

In an embodiment, determining the first current further includes determining a magnitude of the first current in a digital domain to form a digital first magnitude, and converting the digital first magnitude to the first current using a first current digital-to-analog (D/A) converter. Likewise, determining the second current further includes determining a magnitude of the second current in the digital domain to form a digital second magnitude, and converting the digital second magnitude to the second current using a second current digital-to-analog (D/A) converter. In some cases, the first D/A converter has a higher bit resolution than the second D/A converter.

In an embodiment, the method further includes determining a third current based on the measuring, and summing the third current at the power supply node with the first current and the second current. Determining the third current includes operating a third controller having a third bandwidth greater than the first bandwidth and greater than the second bandwidth. In such embodiments, the first controller may include an integral (I) controller, the second controller may include a proportional (P) controller, and the third controller may include a differential (D) controller. Alternatively, other controller types may be used for the first, second and third controllers.

In accordance with a further embodiment, a circuit includes a first and second control path having inputs coupled to a power supply node. The first control path includes a first controller having a first bandwidth, such that the first control path is configured to produce a first output current at the power supply node. Likewise, the second control path includes a second controller having a second bandwidth higher than the first bandwidth, such that the second control path is configured to produce a second output current at the power supply node. The first controller may include a proportional-integral (PI) controller, and the second controller may include a proportional-differential (PD) controller.

In an embodiment, the circuit may further include a third control path having an input coupled to the power supply node, such that the third control path has a third controller having a third bandwidth higher than the second bandwidth, and the third control path is configured to produce a third output current at the power supply node. The first controller may include an integral (I) controller, the second controller may include a proportional (P) controller, and the third controller may include a differential (D) controller. Alternatively, other controller types may be used.

In an embodiment, the input of the first control path is coupled to the power supply node via a first input stage, and the input of the second control path is coupled to the power supply node via a second input stage. Alternatively, the input of the first control path and the input of the second control path are coupled to the power supply node via an input stage. The input stage may include a comparator having a first input coupled to the power supply node.

In an embodiment, the circuit further includes a decimator coupled between the input stage and the first control path, and first control path includes a first digital control circuit having an input coupled to an output of the decimator. The circuit may further include a first current digital-to-analog converter (IDAC) having a first input coupled to an output of the first digital control circuit. Furthermore, the second control path may include a second digital control circuit having an input coupled to the input stage, and a second IDAC having a first input coupled to an output of the second digital control circuit. The first control path may further include a first current mirror coupled between the first IDAC and the power supply node, such that the first current mirror has a first current mirror ratio. Likewise, the second control path may further include a second current mirror coupled between the first IDAC and the power supply node, such that the second current mirror comprises a second current mirror ratio. In some cases, the first current mirror ratio is greater than the first current mirror ratio. The first current mirror may further include a higher capacitance than the second current mirror.

In accordance with a further embodiment, a power supply system includes an analog-to-digital converter (ADC) having an input coupled to a power supply output node, a first control path and a second control path. The first control path includes a first digital controller including an input coupled to an output of the ADC, a first current digital-to-analog converter (IDAC) having an input coupled to an output of the first digital controller, and a first current mirror having an input coupled to an output of the first IDAC and an output coupled to the power supply output node. The second control path includes a second digital controller comprising an input coupled to an output of the ADC, a second current digital-to-analog converter (IDAC) having an input coupled to an output of the second digital controller, and a second current mirror having an input coupled to an output of the second IDAC and an output coupled to the power supply output node. The bandwidth of the second control path is greater than a bandwidth of the first control path.

In an embodiment, the first current mirror has a higher current mirror ratio than the second current mirror. In some cases, the first current mirror includes a first output transistor having a first gate capacitance, the second current mirror includes a second output transistor having a second gate capacitance, and the first gate capacitance may is greater than the second gate capacitance.

In an embodiment, the first digital controller is configured to operate at a first sampling rate, the second digital controller is configured to operate at a second sampling rate, and the second sampling rate is greater than the first sampling rate. The first digital controller may include a proportional-integral (PI) controller, and the second digital controller comprises a proportional-differential (PD) controller. Alternatively, other controller types may be used.

In an embodiment, the first current mirror is configured to provide a higher average output current than the second current mirror. In a further embodiment, the second control path is configured to attenuate transients at the power supply node that have a frequency higher than the bandwidth of the first control path.

In an embodiment, the power supply system further includes a control data interface coupled to outputs of the first digital controller and the second digital controller, and a further function block coupled to an output of the control data interface. The control data interface may be configured to filter, decimate and/or interpolate at least one of the outputs of the first digital controller and the second digital controller, and the further function block may include a slew rate enhancement block.

Advantages of embodiments of the present invention include the ability to provide voltage control on a power line at high frequencies in a stable manner, while still maintaining low internal power consumption. In some embodiments, the implementation cost is reduced compared to other embodiments due to reducing and/or minimizing high speed and/or high sampling rates of the controller.

Advantages of embodiments that employ coefficient scaling for coefficients such as Ki, Kp and Kd in the analog domain by scaling or adjusting currents allows for a simple digital path implementation and a high achievable frequency of operation.

A further advantage of embodiments include the ability to improve the data transmission rate on the sensor bus, due to faster and more accurate settling behavior which is achieved by better control of resonance effects on the line. In some embodiments, this more accurate settling behavior may reduce inter-symbol interference.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A method of controlling a power supply node, the method comprising:
    measuring a first signal of the power supply node to form a first measurement stream;
    decimating the first measurement stream to form a first decimated measurement stream;
    determining a second signal based on the first decimated measurement stream, wherein the determining the second signal comprises operating a first controller having a first bandwidth;
    determining a third signal based on the measuring, wherein the determining the third signal comprises operating a second controller having a second bandwidth greater than the first bandwidth; and
    summing the second signal and the third signal at the power supply node.

2. The method of claim 1, wherein measuring the first signal comprises performing an A/D conversion.

3. The method of claim 1, wherein:
    the first controller comprises a proportional-integral (PI) controller; and
    the second controller comprises a proportional-differential (PD) controller.

4. The method of claim 1, wherein:
    the operating the first controller comprises operating the first controller at a first sampling rate; and
    the operating the second controller comprises operating the second controller at a second sampling rate greater than the first sampling rate.

5. The method of claim 1, wherein the summing the second signal and the third signal comprises:
    providing a first current proportional to the second signal to the power supply node using a first current mirror; and
    providing a second current proportional to the third signal using a second current mirror.

6. The method of claim 1, wherein
the determining the second signal further comprises
determining a magnitude of second in a digital domain to form a digital first magnitude, and
converting the digital first magnitude to the second signal using a first digital-to-analog (D/A) converter, and
the determining the third signal further comprises
determining a magnitude of the third signal in the digital domain to form a digital second magnitude; and
converting the digital second magnitude to the third signal using a second digital-to-analog (D/A) converter.

7. The method of claim 6, wherein the first D/A converter has a higher bit resolution than the second D/A converter.

8. The method of claim 1, further comprising:
determining a fourth signal based on the measuring, wherein the determining the fourth signal comprises operating a third controller having a third bandwidth greater than the first bandwidth and greater than the second bandwidth; and
summing the fourth signal at the power supply node with the third signal and the fourth signal.

9. The method of claim 8, wherein:
the first controller comprises an integral (I) controller;
the second controller comprises a proportional (P) controller; and
the third controller comprises a differential (D) controller.

10. The method of claim 1, further comprising supplying power to an electronic device having a power supply coupled to the power supply node.

11. The method of claim 10, wherein the electronic device comprises an automotive sensor.

12. A circuit comprising:
a first control path having an input coupled to a power supply node, wherein
the first control path comprises a first controller having a first bandwidth, and a first decimator coupled between the input of the first control path and an input of the first controller, wherein the first control path is configured to produce a first output signal at the power supply node; and
a second control path having an input coupled to the power supply node, wherein
the second control path comprises a second controller having a second bandwidth higher than the first bandwidth, and the second control path is configured to produce a second output signal at the power supply node.

13. The circuit of claim 12, wherein:
the first controller comprises a proportional-integral (PI) controller; and
the second controller comprises a proportional-differential (PD) controller.

14. The circuit of claim 12, further comprising a third control path having an input coupled to the power supply node, wherein
the third control path comprises a third controller having a third bandwidth higher than the second bandwidth, and the third control path is configured to produce a third output signal at the power supply node.

15. The circuit of claim 14, wherein:
the first controller comprises an integral (I) controller;
the second controller comprises a proportional (P) controller; and
the third controller comprises a differential (D) controller.

16. The circuit of claim 12, wherein:
the input of the first control path is coupled to the power supply node via a first input stage; and
the input of the second control path is coupled to the power supply node via a second input stage.

17. The circuit of claim 12, wherein the input of the first control path and the input of the second control path are coupled to the power supply node via an input stage.

18. The circuit of claim 17, wherein the input stage comprises a comparator having a first input coupled to the power supply node.

19. The circuit of claim 18, wherein:
the first control path comprises a first digital control circuit having an input coupled to an output of the first decimator;
a first digital-to-analog converter (DAC) having a first input coupled to an output of the first digital control circuit;
the second control path comprises a second digital control circuit having an input coupled to the input stage; and
a second DAC having a first input coupled to an output of the second digital control circuit.

20. The circuit of claim 19, wherein:
the first control path further comprises a first current generator coupled between the first DAC and the power supply node, the first current generator configured to provide a first current proportional to an output signal of the first DAC according to a first proportion; and
the second control path further comprises a second current generator coupled between the second DAC and the power supply node, wherein the second current generator is configured to provide a second current proportional to an output signal of the second DAC according to a second proportion.

21. The circuit of claim 20, wherein the first proportion is greater than the second proportion.

22. The circuit of claim 21, further comprising a sensor having a power input coupled to the power supply node.

23. A system comprising:
a power supply comprising
an analog-to-digital converter (ADC) having an input coupled to an output node of the power supply;
a first control path comprising
a first digital controller comprising an input coupled to an output of the ADC,
a first digital-to-analog converter (DAC) having an input coupled to an output of the first digital controller,
a first current generator having an input coupled to an output of the first DAC and an output coupled to the output node of the power supply, the first current generator configured to provide a first current proportional to an output signal of the first DAC; and
a second control path comprising
a second digital controller comprising an input coupled to an output of the ADC,
a second digital-to-analog converter (DAC) having an input coupled to an output of the second digital controller, and
a second current generator having an input coupled to an output of the second DAC and an output coupled to the output node of the power supply, wherein the second current generator is configured to provide a first current proportional to an output signal of the second DAC, and a bandwidth of the second control path is greater than a bandwidth of the first control path.

24. The system of claim 23, wherein the output node of the power supply is configured to be coupled to a power supply of a sensor.

25. The system of claim 24, further comprising the sensor.

26. The system of claim 25, wherein the sensor comprises an automotive sensor.

* * * * *